(12) United States Patent
Douglass et al.

(10) Patent No.: US 8,365,525 B2
(45) Date of Patent: Feb. 5, 2013

(54) THERMO-MAGNETIC ACTUATOR

(75) Inventors: Stephen L. Douglass, Newbury, OH (US); Michael Leonard Davis, Jr., Madison, OH (US); Michael Victor Kaminski, Elyria, OH (US); Michael James Keller, Tallmadge, OH (US); Michael Adam Pintz, Fairview Park, OH (US); Gene J. Cicigoi, Jr., Mentor, OH (US)

(73) Assignee: Thermotion, LLC, Mentor, OH (US)

( * ) Notice: Subject to any disclaimer, the term of this patent is extended or adjusted under 35 U.S.C. 154(b) by 697 days.

(21) Appl. No.: 12/564,160

(22) Filed: Sep. 22, 2009

(65) Prior Publication Data
US 2011/0067394 A1 Mar. 24, 2011

(51) Int. Cl.
F03C 1/00 (2006.01)
(52) U.S. Cl. ............................................. 60/531; 60/530
(58) Field of Classification Search ............ 60/517–526, 60/531
See application file for complete search history.

(56) References Cited

U.S. PATENT DOCUMENTS

| 4,759,189 | A | 7/1988 | Stropkay et al. |
| 4,887,429 | A | 12/1989 | Birli, Sr. et al. |
| 5,396,770 | A | 3/1995 | Petot et al. |
| 6,052,992 | A * | 4/2000 | Eroshenko ............... 60/509 |
| 6,895,751 | B1 | 5/2005 | Greentree |
| 7,185,578 | B2 | 3/2007 | Sanderson |
| 7,536,860 | B2 | 5/2009 | Safran et al. |
| 2007/0271915 | A1 * | 11/2007 | Safran et al. ............ 60/531 |

* cited by examiner

*Primary Examiner* — Thomas Denion
*Assistant Examiner* — Brian Inacay
(74) *Attorney, Agent, or Firm* — Leydig, Voit & Mayer, Ltd.

(57) ABSTRACT

A thermo-magnetic actuator includes operative components, preferably in a sealed container, from which a rotatable or translatable shaft extends. The shaft is driven by supplying electrical power to a heater in a closed chamber containing a working fluid that expands upon being heated. The expansion of the fluid drives a piston that, in turn, slides a rack coupled to the shaft. A ferromagnetic target is connected to the rack and attracted by a magnetic field produced by an electromagnet that receives electrical power from the same source as the heater. The attraction of the target causes an end of the target to latch magnetically and mechanically and to open an electrical switch, disconnecting current flow to the heater, without disturbing current flow to the electromagnet. The target is released and the rack and target return to their original positions upon termination of current flow to the electromagnet.

20 Claims, 12 Drawing Sheets

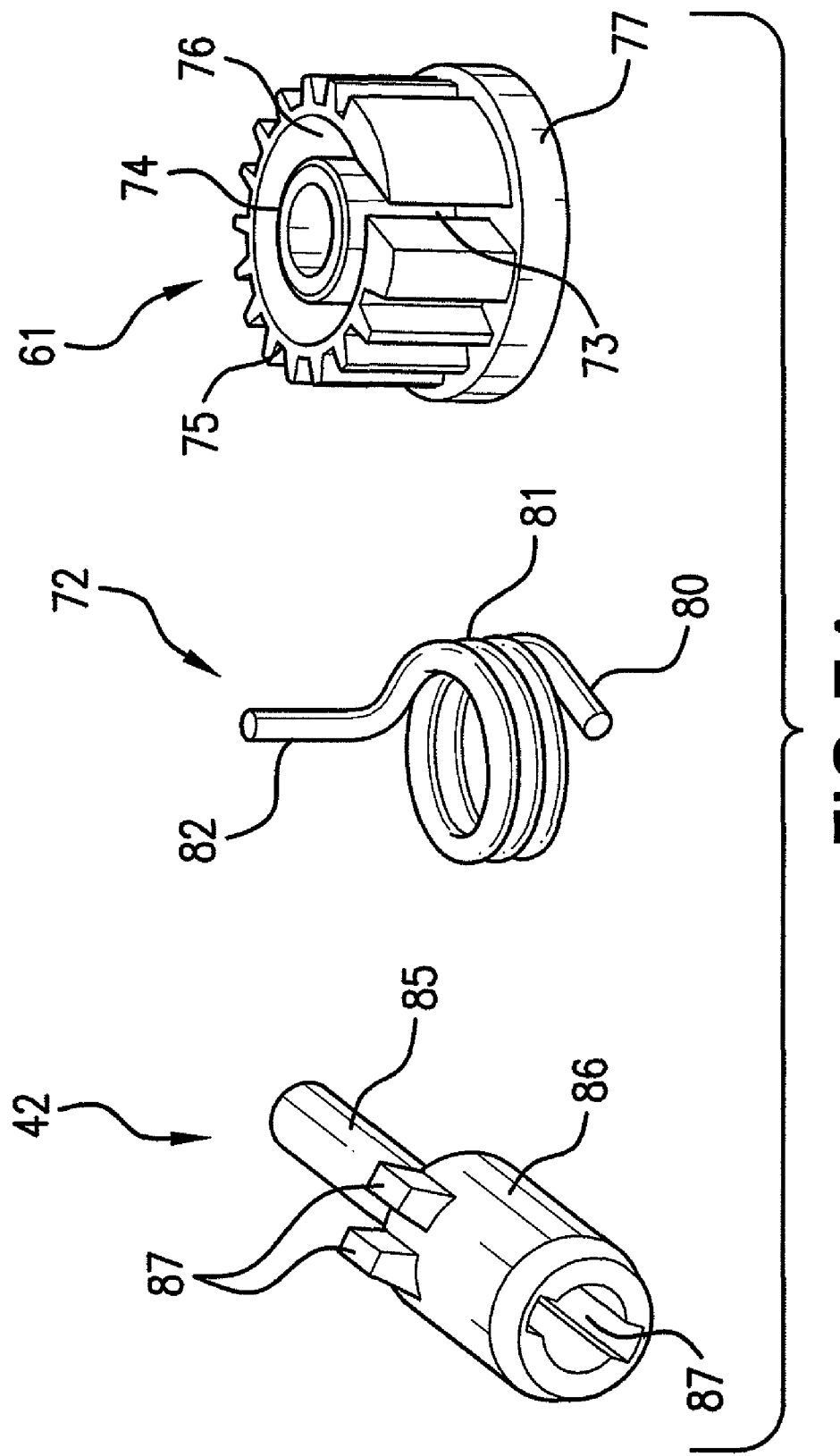

THERMO-MAGNETIC ACTUATOR

FIELD OF THE INVENTION

The present invention relates to actuators in which motion of an object is produced in response to a stimulus, usually electrical power, and reversal of the motion results from withdrawal of the same stimulus or release of an influence preventing reversal of the motion. The invention particularly relates to actuators with reduced power consumption after application of the stimulus and before reversal of the motion. The invention further relates to actuators in which a magnetic field provides an influence for preventing reversal of the motion after withdrawal of the stimulus and until removal of the magnetic field.

BACKGROUND OF THE INVENTION

Actuators producing mechanical movement of an object in response to the application of a stimulus, such as electrical power, are well known. Among actuators that are small and that respond to the application of electrical power to produce motion are electrothermal actuators. Examples of such actuators are described in U.S. Pat. Nos. 4,759,189, 4,887,429, and 7,536,860, each of which is incorporated herein by reference. Within these electrothermal actuators, a closed chamber contains a working fluid. The working fluid is mostly a liquid at ambient temperature and evaporates to the gas phase when heated. That gas phase of the fluid expands upon further heating, increasing internal pressure within the chamber. In the following description, the reference to a fluid encompasses both the liquid and gas phases, with the gas phase expanding upon heating to provide the motive force of the actuator. The chamber includes an electrically powered heater that supplies heat to the fluid, in response to an electrical current supplied to the heater. The heat produces a phase change in the working fluid and a pressure increase within the chamber. In response to the increased internal pressure in the chamber, a flexible rolling diaphragm, usually peripherally clamped to the housing of the electrothermal actuator, is displaced. The diaphragm displacement pushes a piston that may drive a piston rod in a linear direction, for example, to increase protrusion of the piston rod from the housing of the electrothermal actuator.

Typically, an electrothermal actuator includes a return spring biasing the piston toward the position before heating of the working fluid. The expansion of the working fluid and the movement of the diaphragm provide a force that counteracts the restoring force of the spring. In order to maintain a particular extension of the piston rod in many conventional electrothermal actuators, the pressure within the chamber must be maintained by continuing the flow of electrical current to the heater. In some applications, the continuing consumption of electrical power to keep the piston rod extended is undesirable. Elimination of or at least a reduction in the amount of electrical power required to maintain the extension of the piston rod is, in many applications, highly desirable.

In addition, in actuators in which the working fluid remains in the gas phase during the entire time a piston rod is extended, the response time for retraction of the piston rod can be undesirably long. Once electrical current to the heater is stopped, the working fluid must cool for the pressure in the chamber to decline, permitting retraction of the piston. A much shorter response time in retraction of the piston rod is very important in some applications of electrothermal actuators.

One known electrothermal actuator, described in U.S. Pat. No. 5,396,770, reduces, and even eliminates, the necessity for continuing the supply of electrical power after extension of the piston rod, for maintenance of the piston rod in an extended position. The electrothermal actuator described in that patent includes a mechanical latch mechanism that engages the piston rod when the piston rod is fully extended. The latch prevents retraction of the piston rod so that electrical current flow to the heater can be terminated. In order to release the piston rod so that it retracts, the latch mechanism must be released. The latch mechanism includes a coil and a magnetic member. A magnetic field is produced by applying an electrical current to the coil. The magnetic field moves the magnetic member, releasing the latch, so that the piston rod retracts. When the piston rod is latched, the piston rod does not return to the initial position, with the piston rod retracted, upon loss or withdrawal of all electrical power. In other words, the fail-safe position of the piston rod depends upon whether the piston rod has been latched before the loss of power. In many applications it is desirable that the fail-safe position, as in actuators without mechanical latches, be the retracted position of the piston rod. In this mechanically latching actuator, piston rod retraction time can be shortened if the latch is not released until after the working fluid has cooled.

U.S. Pat. No. 7,536,860 describes an actuator in which a magnetic field is used to hold the piston rod in an extended position. In one described embodiment, the piston rod carries a magnetic collar. The housing of the actuator includes an electromagnet positioned at the end of the housing where the piston rod is located. When the electromagnet is energized and the magnetic collar is nearby, the piston rod can be maintained in the extended position with no electrical power applied to the heater. The only power consumption is by the electromagnet to retain the piston rod in the extended position. Provided the working fluid has cooled while the piston is held in the extended position, the piston rod can retract relatively quickly upon termination of current flow to the electromagnet.

SUMMARY OF THE INVENTION

Accordingly, it is desirable to provide an actuator in which a piston is displaced in response to actuation of the actuator by application of electrical power, and in which electrical power consumption can be reduced after displacement of the piston, while the actuator remains actuated, and in which, upon the failure of the electrical power, the piston returns to a prior position. Further, it is desirable to produce an actuator in which the piston quickly returns to its original position upon withdrawal of electrical power from the actuator.

A thermo-magnetic actuator according to the invention includes a tray having opposed first and second walls, and third walls joining the first and second walls; a closed heating chamber disposed within the tray, proximate the first wall, the closed heating chamber including a diaphragm as one wall of the chamber, remote from the first wall of the tray, a working fluid changing phase upon heating and located within the closed heating chamber, and an electrical heater disposed within the closed heating chamber for heating the working fluid upon application of electrical power to the electrical heater; a piston disposed within and slidable relative to the tray, having a first end contacting the diaphragm so that the piston is driven and slides relative to the tray from a first position to a second position upon movement of the diaphragm in response to heating of the working fluid, and a second end, opposite the first end; a tubular rack slidably disposed in the tray, having a first end engageable by the piston, at the first end of the piston, for sliding the tubular rack from a first position to a second position when the piston is driven by the diaphragm from the first position to the second position, and a second end, opposite the first end of the tubular rack; a first spring bearing on the second end of the piston and the second wall and urging the piston against the diaphragm; a second spring bearing on the second end of the tubular rack and the second wall and urging the tubular rack toward the closed heating chamber; a ferromagnetic target having opposed first and second ends and a central portion generally transverse to and joining the first and second ends, the first end being received in a recess in the tubular rack proximate the closed heating chamber, with the central portion extending from the first end along the tubular rack, away from the closed heating chamber; an electromagnet located in the tray proximate the second end of the tubular rack, with the ferromagnetic target disposed between the tubular rack and the electromagnet, the electromagnet attracting the ferromagnetic target when an electrical current flows through the electromagnet; an electrical switch having electrically open and electrically closed states, disposed in the tray proximate the second end of the tubular rack and the electromagnet for opening and closing a current path to the electrical heater, the electrical switch being actuated to electrically open the current path to the electrical heater by the ferromagnetic target when the rack slides to the second position, the electromagnet attracts the ferromagnetic target, and the second end of the ferromagnetic target actuates the switch; a gear rack on an external surface of the tubular rack; and a pinion gear on a rotatable shaft that is accessible from outside the tray, the pinion gear being in mesh with the gear rack so that sliding of the tubular rack between the first and second positions rotates the shaft and the pinion gear.

A thermo-magnetic actuator according to the invention includes a tray having opposed first and second walls, and third walls joining the first and second walls; a closed heating chamber disposed within the tray proximate the first wall, the closed heating chamber including a diaphragm as one wall of the chamber, remote from the first wall of the tray, a working fluid changing phase upon heating and located within the closed heating chamber, and an electrical heater disposed within the closed heating chamber for heating the working fluid upon application of electrical power to the electrical heater; a piston disposed within and slidable relative to the tray, having a first end contacting the diaphragm so that the piston is driven and slides relative the tray from a first position to a second position upon movement of the diaphragm in response to heating of the working fluid, and a second end, opposite the first end; a tubular rack slidably disposed in the tray, having a first end engageable by the piston, at the first end of the piston, for sliding the tubular rack from a first position to a second position when the piston is driven by the diaphragm from the first position to the second position, and a second end, opposite the first end of the tubular rack; a first spring bearing on the second end of the piston and the second wall and urging the piston against the diaphragm; a second spring bearing on the second end of the tubular rack and the second wall and urging the tubular rack toward the closed heating chamber; a ferromagnetic target having opposed first and second ends and a central portion generally transverse to and joining the first and second ends, the first end being received in a recess in the tubular rack proximate the closed heating chamber, and the central portion extending from the first end along the tubular rack, away from the closed heating chamber; an electromagnet located in the tray proximate the second end of the tubular rack, with the ferromagnetic target disposed between the tubular rack and the electromagnet, the electromagnet attracting the ferromagnetic target when an electrical current flows through the electromagnet; an electrical switch having electrically open and electrically closed states, disposed in the tray proximate the second end of the tubular rack and the electromagnet for opening and closing a current path to the electrical heater, the electrical switch being actuated to electrically open the current path to the electrical heater by the ferromagnetic target when the rack slides to the second position, the electromagnet attracts the ferromagnetic target, and the second end of the ferromagnetic target actuates the switch; and a rod on an exterior surface of the rack and extending outside the tray so that sliding of the tubular rack between the first and second positions extends and retracts the rod with respect to the tray.

A thermo-magnetic actuator according to the invention further includes a tray having opposed first and second walls, and third walls joining the first and second walls; a closed heating chamber disposed within the tray proximate the first wall, the closed heating chamber including a diaphragm as one wall of the chamber, remote from the first wall of the tray, a working fluid changing phase upon heating and located within the closed heating chamber, and an electrical heater disposed within the closed heating chamber for heating the working fluid upon application of electrical power to the electrical heater; a piston disposed within and slidable relative to the tray, having a first end contacting the diaphragm so that the piston is driven and slides relative to the tray from a first position to a second position upon movement of the diaphragm in response to heating of the working fluid, and a second end, opposite the first end; a tubular rack slidably disposed in the tray, having a first end engageable by the piston, at the first end of the piston, for sliding the tubular rack from a first position to a second position when the piston is driven by the diaphragm from the first position to the second position, a second end, opposite the first end of the tubular rack; a first spring bearing on the second end of the piston and the second wall and urging the piston against the diaphragm; a second spring bearing on the second end of the tubular rack and the second wall and urging the tubular rack toward the closed heating chamber; a gear rack on an external surface of the rack; a pinion gear mounted on a rotatable shaft that is accessible from outside the tray, the pinion gear being in mesh with the gear rack so that sliding of the tubular rack between the first and second positions rotates the shaft and the pinion gear; and a third spring resiliently coupling the pinion gear to the shaft and absorbing counter rotational torque applied to the pinion gear through the shaft.

BRIEF DESCRIPTION OF DRAWING FIGURES

FIGS. 7A and 7B, are respectively, detail views of a pinion gear, a biasing spring, and a coupling shaft, disassembled and assembled, as part of a thermo-magnetic actuator.

DETAILED DESCRIPTION

Figure 1A:
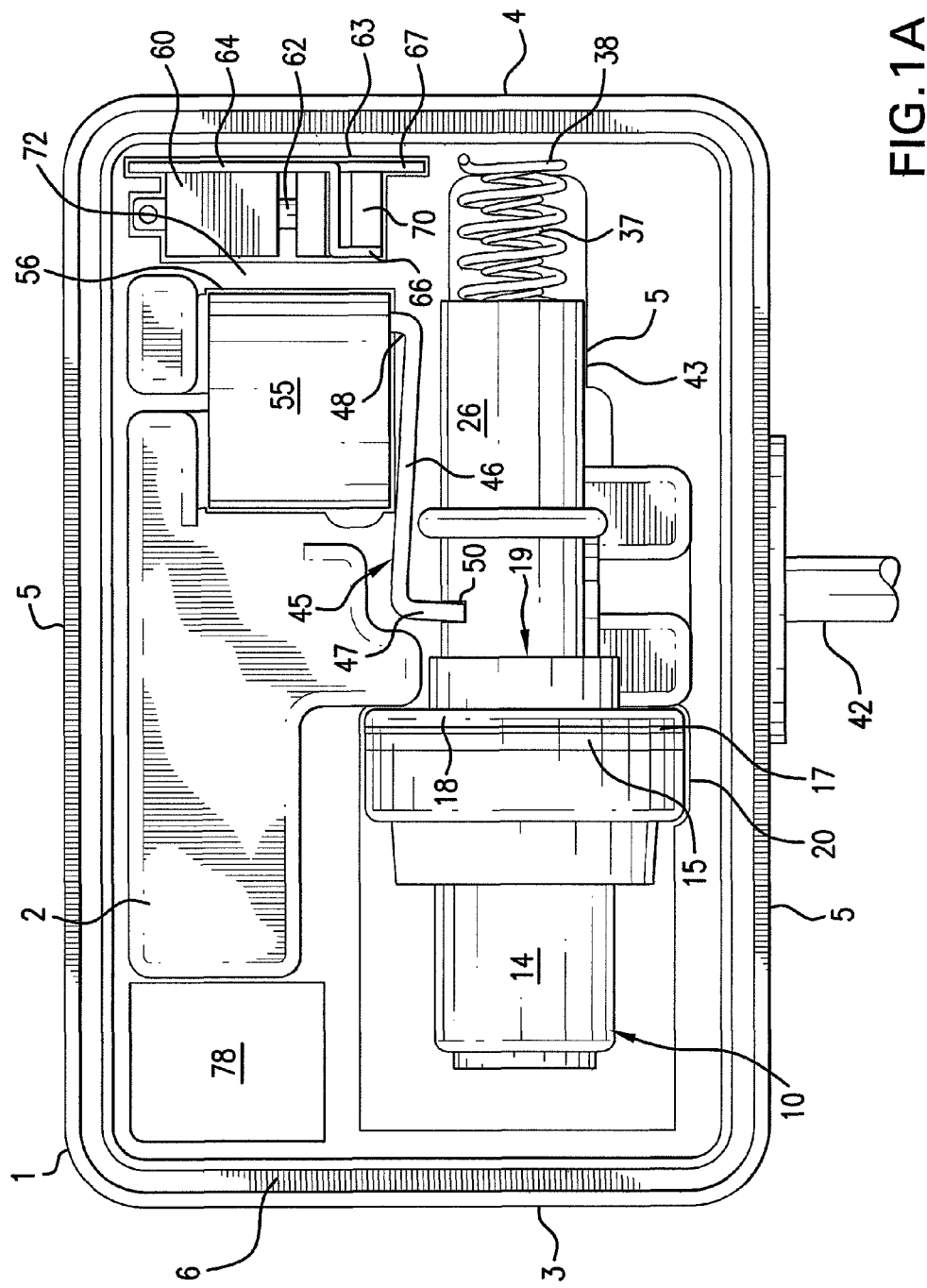
FIG. 1A is a plan view of a thermo-magnetic actuator according to an embodiment of the invention and including a tray.
Figure 1B:
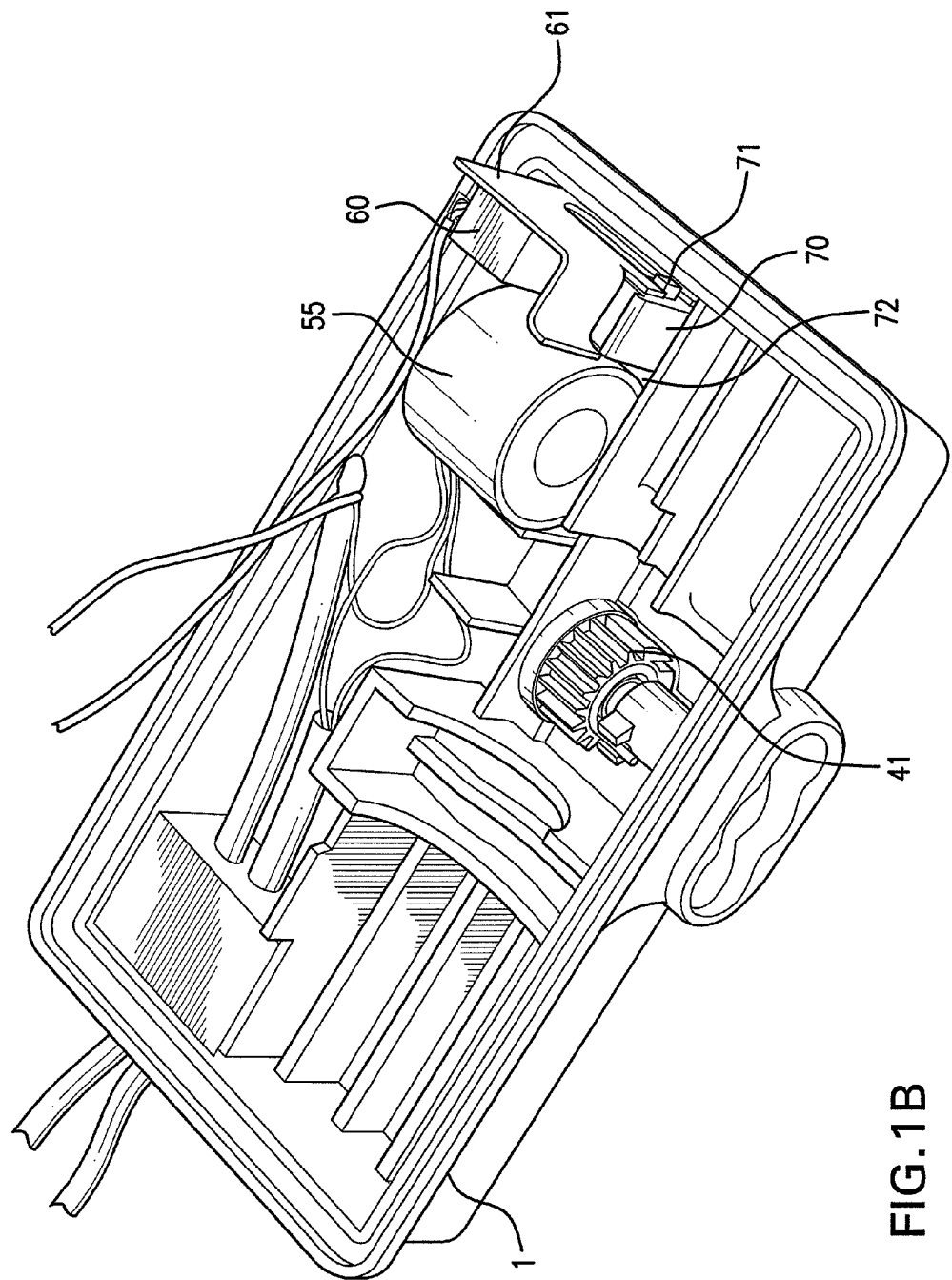
FIG. 1B is a perspective view of the tray with some parts of the actuator in the tray.

FIG. 1A is a plan view of a thermo-magnetic actuator according to an embodiment of the invention and including a tray 1. FIG. 1B is a perspective view of the tray with some parts of the actuator in the tray. The thermo-magnetic actuator is frequently used in a hostile environment so that it is important to protect the moving parts of the actuator from foreign matter and other adverse environmental effects. This goal is achieved in the depicted embodiment by disposing the operative parts of the thermo-magnetic actuator, as described below, within a container. The container includes the tray 1 shown in FIGS. 1A and 1B. The depicted tray includes a floor 2 from which there are upstanding ribs and sidewalls forming, in the depicted embodiment, a generally rectangular volume. The walls include first and second side walls 3 and 4 as well as a pair of opposed third side walls 5 defining the tray 1. The side walls include a sealing means at a surface that is generally parallel to the surface of the floor 2. The sealing means illustrated includes a laterally projecting wall with a peripheral groove 6.

Figure 1C:
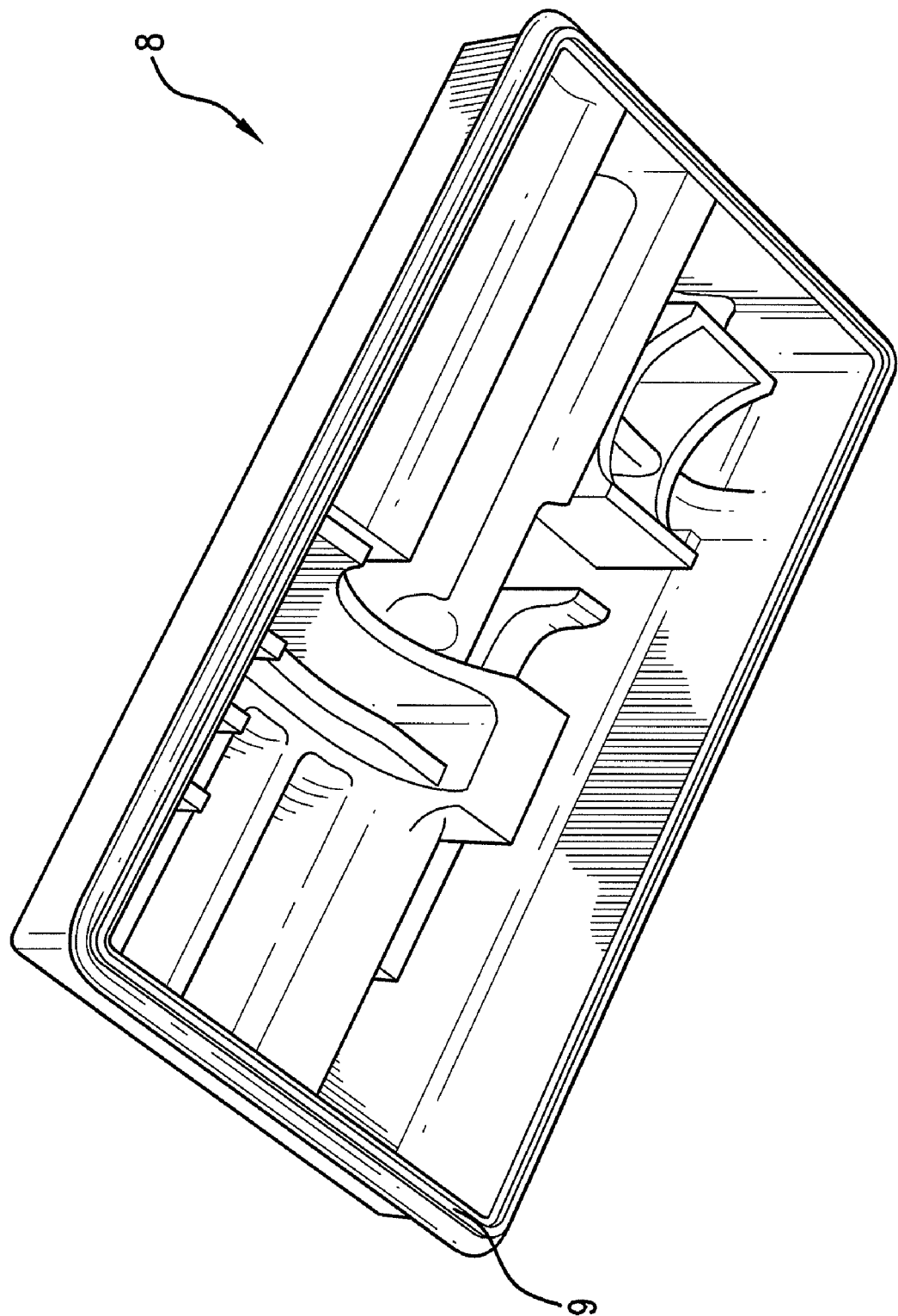
FIG. 1C is a perspective view of a lid, which is complementary to the tray of FIGS. 1A and 1B, for forming a sealed container with the tray.
Figure 3:
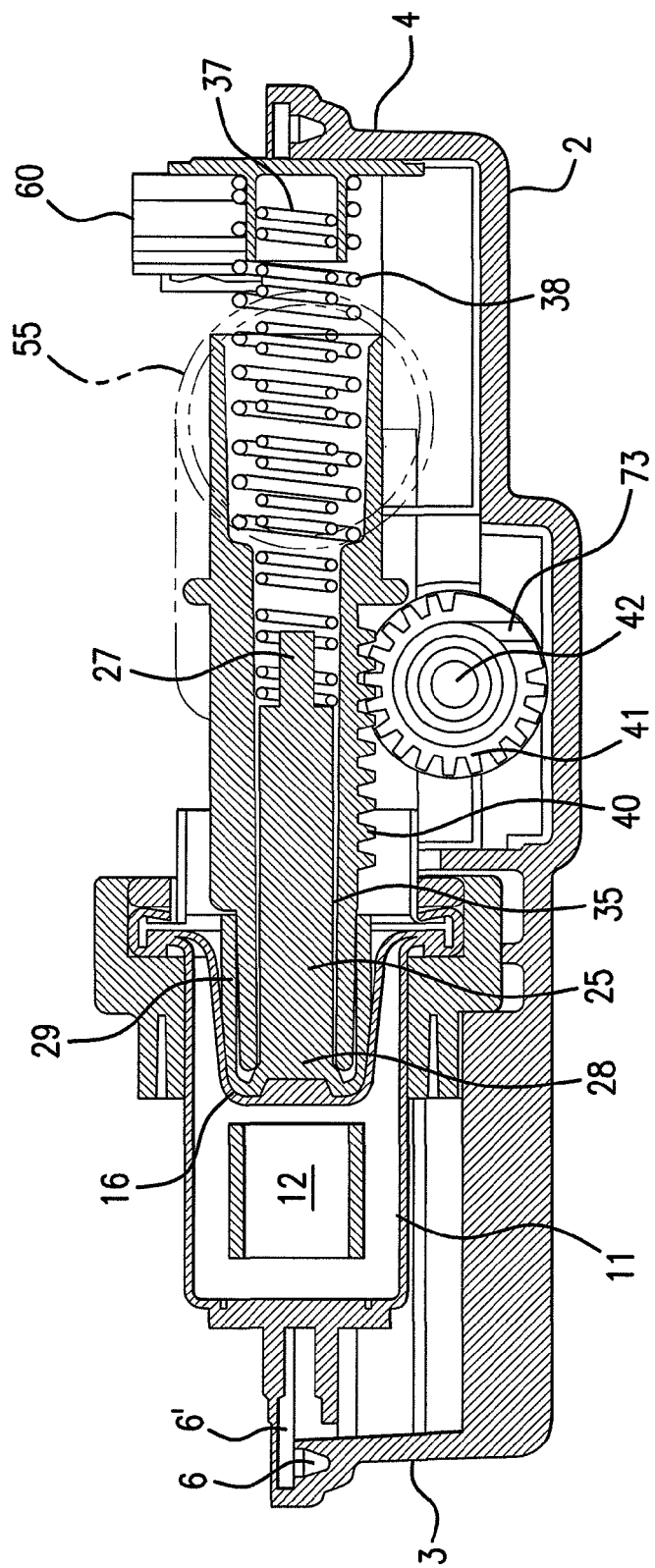
FIG. 3 is a sectional side view of the thermo-magnetic actuator and tray of FIG. 1A taken along the central axis of the piston, with the thermo-magnetic actuator in a non-powered state.

In order to seal the container, a lid 8, with a sealing means complementary to the sealing means of the tray 1, as indicated in FIG. 1C, is provided. The lid 8, for example includes, a peripheral tongue 9 received within the peripheral groove 6 of the tray. The tongue and groove locations may be reversed and different sealing arrangements of the tray and lid may be employed in place of the tongue and groove. Further, a flowable adhesive and sealant, such as an acrylic compound, may be applied to the respective sealing means for, when cured, bonding and sealing the lid 8 to the tray 1. It is also desirable to include an auxiliary tongue and groove set that is transverse to the groove 6 and tongue 9. This auxiliary tongue and groove set provides for "snapping" of the lid to the tray. An example of an auxiliary groove 6' in the tray 1 is indicated in FIG. 3. This mechanical attachment clamps the lid and tray together while the adhesive and sealant applied between the tongue 9 and groove 6 cures.

As shown in FIG. 1C, the lid 8 includes projecting ribs and recesses defined by projections from a ceiling of the lid. These ribs and recesses are complementary to and act in cooperation with similar recesses and ribs of the tray 1, described below, to retain the operative parts of the thermo-magnetic actuator in place within the container. Together, when the tray 1 and lid 8 are sealed together, a completely sealed container may be produced, as required for particular applications of the thermo-magnetic actuator.

As shown in FIG. 1A, the thermo-magnetic actuator includes an assembly of operative parts that interact with each other to output mechanical motion in response to application of an electrical current. Most preferably, these operative parts of the thermo-magnetic actuator are arranged in a fixed mechanical arrangement relative to each other. This fixation is achieved in the depicted embodiment by the recesses and ribs, i.e., walls, which define cooperating volumes between the tray 1 and the lid 8. The volumes are complementary in size and shape to the particular elements received and retain the elements in place within the container of the tray and lid.

Of course, the depicted arrangement with the tray and lid, and the recesses and ribs within the tray and the lid is only exemplary. The same actuator structure may be manufactured with different means of holding the operative elements of the thermo-magnetic actuator in fixed locations, relative to each other.

The principal element, in terms of size, within the tray 1 is a thermal actuator 10 including a closed heating chamber 11. This part of the thermo-magnetic actuator employs technology described in commonly assigned patents, such as the patents identified above. The internal structure of the closed heating chamber is most easily understood with respect to the sectional views of FIGS. 2-5. Within the heating chamber 11 there is an electrical heater 12. The chamber also contains a working fluid 13, such as described in the previously cited commonly assigned patents, that changes phase upon heating. At room temperature and similar temperatures the working fluid 13 is principally a liquid. However, upon heating, the working fluid 13 changes phase, becoming gaseous and thereby increasing the pressure within the heating chamber.

Figure 2:
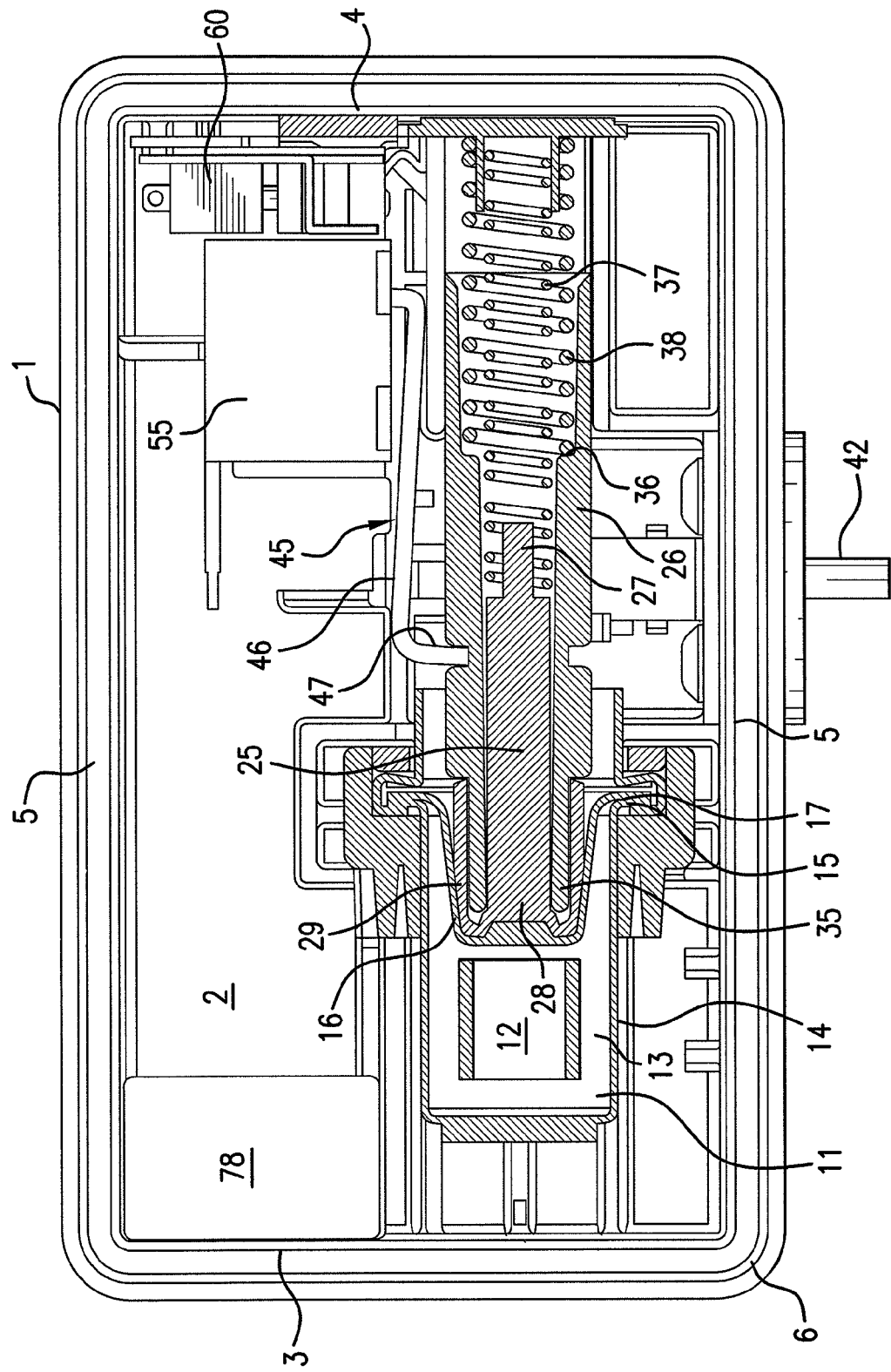
FIG. 2 is a partially sectioned plan view of the thermo-magnetic actuator and tray of FIG. 1A with the thermo-magnetic actuator in a non-powered state.
Figure 5:
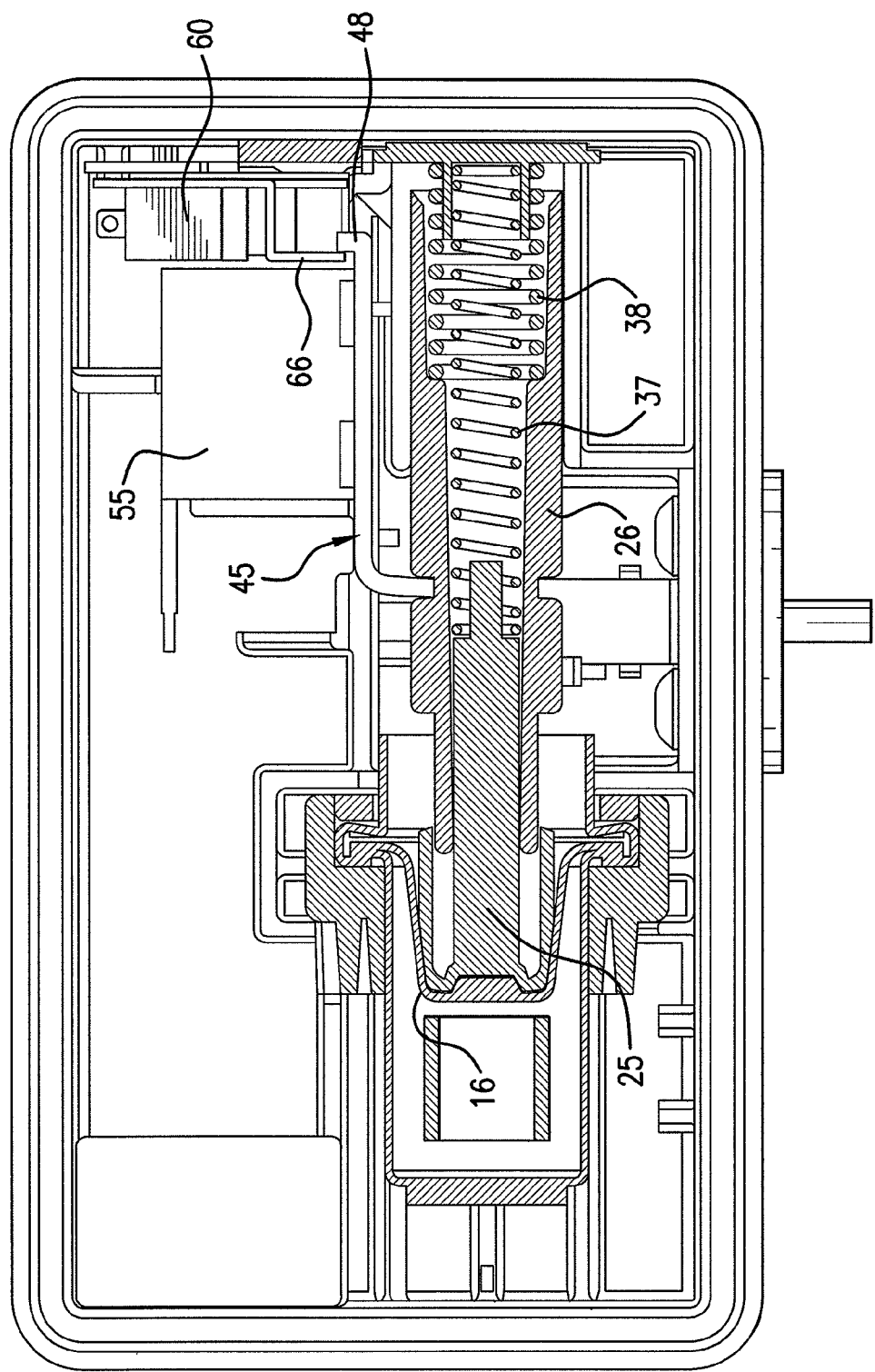
FIG. 5 is a sectional plan view of the thermo-magnetic actuator and tray of FIG. 1A with the thermo-magnetic actuator in a magnetically latched state without power being applied to the heater.

The heating chamber 11 includes a cup 14 that has an open end 15 opposite the heater 12. The open end 15 is closed by a rolling diaphragm 16, i.e., a flexible material that is not attacked by the working fluid. FIGS. 2 and 5 illustrate the position of the diaphragm 16 when the working fluid 13 is not being heated and is relatively cool. Typically, the rolling diaphragm has, in cross-section when the working fluid 13 is cold, a shape that is sometimes referred to as a "pilgrim's hat." The diaphragm 16 is clamped peripherally, at the "brim" of the hat, with the "crown" of the hat disposed facing the heater in the heating chamber 11. As shown at FIG. 1A, the peripheral edge 17 of the diaphragm 16 is clamped between the open end 15 of the heating chamber cup 14 and a cap 18 of the heating chamber. The cap 18 is shown in FIG. 1A as joined to the heating chamber cup 14 at the open end 15. The cap 18 may be joined to the open end 15 of the cup 14 by screws that penetrate the periphery of the cap 18. The cap 18 also includes an axial opening 19 for sliding movement of other parts of the actuator that are described below.

As illustrated in FIG. 1A, the floor 2 of the tray 1 preferably includes a recess 20, complementary in shape to part of the heating chamber cup 14 and cap 18, that holds the heating chamber in place. Another such recess is present in the lid 8.

As shown in the partial sectional views of FIGS. 2-5, the central part of the "crown" of the diaphragm 16 bears upon a first end of a piston 25. The piston 25 is slidable and is coupled to a tubular rack 26 as described in greater detail below. The piston 25 and the tubular rack 26 are coaxial and the second end of the piston, opposite the first end, includes a projecting pin 27 for retaining a spring as described later. The first end of the piston includes a central core 28 and a peripheral tubular shell 29. An annular volume is defined between the core 28 and the shell 29.

Figure 4:
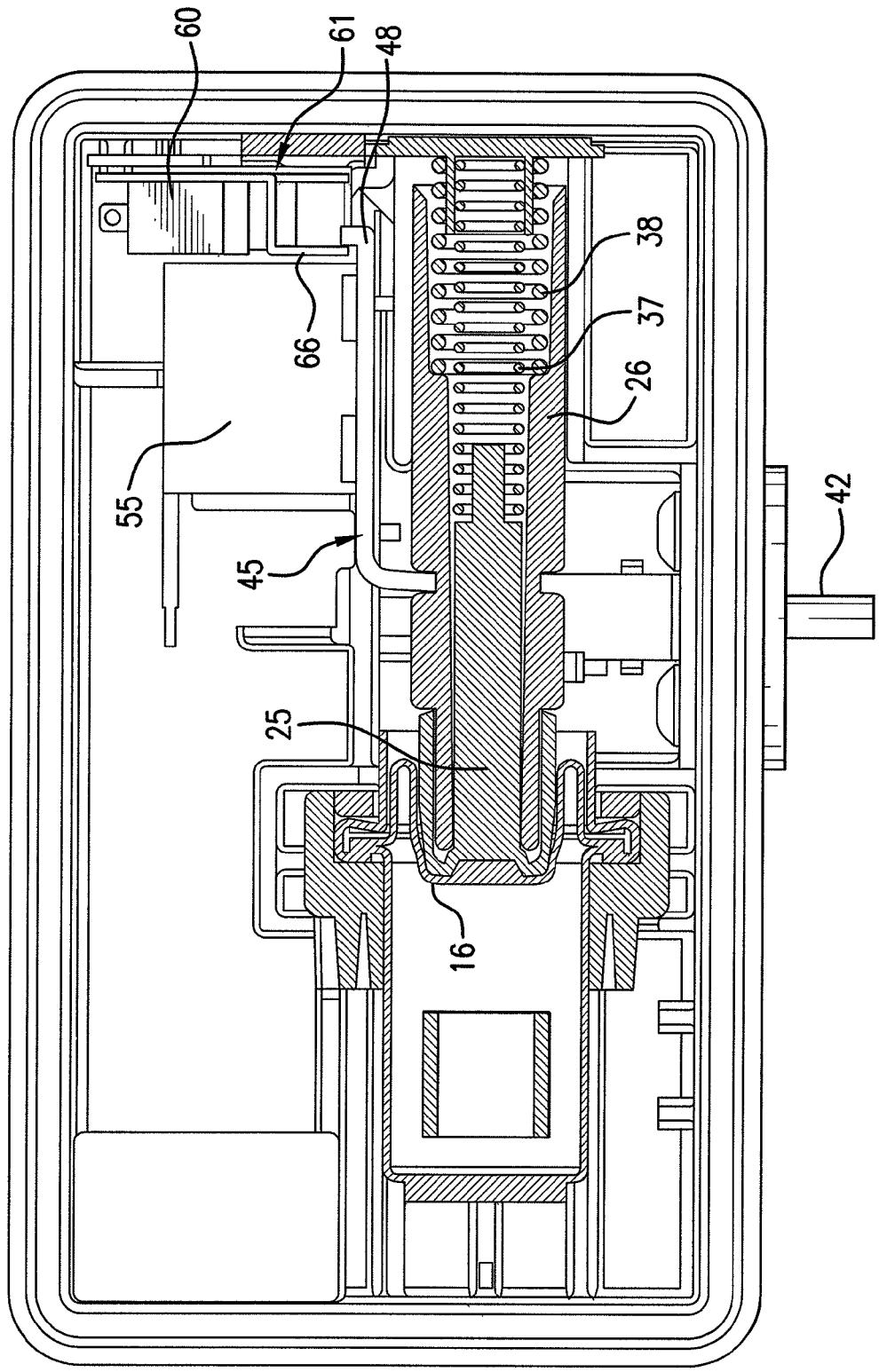
FIG. 4 is a partially sectioned plan view of the thermo-magnetic actuator and tray of FIG. 1A with the thermo-magnetic actuator in a magnetically latched state with power applied to the heater.

The tubular rack 26 includes, at a first end, a projecting tube 35 that is dimensioned to be snugly received within the annular volume of the piston, between the core 28 and the shell 29. The tubular rack is larger in outside dimension just beyond the part of the rack that is received in the annular volume of the piston 25 so that the shell 29 of the piston abuts corresponding surfaces of the tubular rack. The tubular rack is pushed by the piston at these abutting surfaces, as illustrated in FIG. 4 and described in greater detail below. At the second, opposite end of the rack, the rack is also tubular and includes a stepped surface 36 cooperating with a restoring spring as described below.

As shown in FIGS. 1A and 2-5, at the second end of the tubular rack 26, first and second spiral coil springs 37 and 38 are partially present within the tubular rack 26 and partially protrude from the second end of the tubular rack. The first, smaller spring 37 engages the second end of the piston 25 and is held in position by the protecting piston pin 27. The opposite end of the first spring bears on the side wall 4 of the tray 1 or on some intermediate element interposed between the spring and the side wall 4. The second, larger diameter spring 38 is coaxial with the first spring 37 and bears, at a first end, against the stepped surface 36 of the tubular rack. The second end of the second spring 38, like the second end of the first spring 37, bears against the side wall 4 of the tray 1. The two springs 37 and 38 are restoring springs and urge the piston and tubular rack, respectively, toward their respective first positions illustrated in FIG. 2.

As seen in FIG. 3, the tubular rack 26 includes, on an exterior surface, a gear rack 40. This gear rack is in mesh with a pinion gear 41 that, in turn, is mounted on a rotatable shaft 42. The rotatable shaft 42 is preferably supported for rotation by a recess in the tray 1, for example as indicated in FIG. 1B. The shaft is retained in the tray so that there is no translational motion of the shaft, for example, by confining the base of the pinion gear, as described below with respect to FIGS. 7A and 7B, in a recess of the tray 1. The shaft 42 projects through an opening in a side wall, such as one of the side walls 5, of the tray 1. The opening is preferably sealed, for example, with one or more O-rings, to make the container water- and airtight. The seal may be external to or internal to the tray 2. The shaft assembly, and its engagement with an external device, is described in greater detail below with respect to FIGS. 7A and 7B. When the tubular rack, which is slidably mounted within the tray 1, slides in the horizontal direction, as depicted in FIGS. 2-5, the pinion gear 41 is rotated and the shaft 42 is rotated about its axis, transmitting rotary motion to a device outside the tray 1. The external device, which is driven by being coupled to the shaft, may be, for example, a valve controlling the flow of a fluid, vanes, such as in a ventilation system, or any other controlled mechanical device that responds to rotational motion. The tray 1 preferably includes a rack recess 43 that permits the tubular rack 26 to slide within the tray while retaining the tubular rack in a desired position relative to operative parts of the thermo-magnetic actuator within the tray and lid.

Although the tubular rack 26 is not shown in cross-section in any figure, as indicated in FIG. 3, the exterior surface or surfaces of the tubular rack 26 on which the gear rack 40 is disposed may be planar. Thus, the tubular rack 26 may preferably be rectangular or square in cross-section with the piston 25 having an external shape that is complementary to the internal cross-sectional shape of the tubular rack 26. The shape of the exterior surface of the tubular rack 26 is not limited to the rectangular or square shape, and may be circular in cross-section or have a different cross-sectional shape, for example, a polygonal shape.

An important feature of the invention is a magnetic latching structure that permits the thermo-magnetic actuator to become and remain magnetically latched with reduced electrical power being supplied to the thermo-magnetic actuator to maintain the tubular rack in its second position. The magnetic latching structure includes a ferromagnetic target 45 which, in the depicted embodiment, includes a longitudinal central portion 46, generally a planar plate of a ferromagnetic material, with opposed ends 47 and 48. The ends 47 and 48 are generally transverse to the central portion 46 and extend in opposite directions from the respective ends of the central portion 46. These ends 47 and 48 function as hooks. The first end 47 is received within a recess or groove 50 in the exterior surface of the tubular rack 26. Thus, when the tubular rack slides within the tray 1, the tubular rack also slides, i.e., drives, the target 45. The second end 48 of the target 45 latches the tubular rack when the tubular rack moves from the first position, shown in FIGS. 1A and 2, to the second position, shown in FIGS. 4 and 5. The target 45 is limited in lateral movement within the tray 1 and lid 8, i.e., the container, to prevent the first end of the target from detaching from the tubular rack. Movement of the target 45 within the tray and lid may be constrained by supporting surfaces and ribs of the tray and the lid.

The thermo-magnetic actuator includes an electromagnet 55 positioned generally opposite the second end of the tubular rack 26. The electromagnet 55 is received and held in position, preferably, by a magnet recess 56 in the tray 1 and a corresponding recess in the lid 8. Most importantly, the target 45 is located between the tubular rack 26 and the electromagnet 55, with no impediment to the movement of the target toward and away from the electromagnet.

The remaining principal element within the container is an electrical switch assembly including an electrical switch 60. The switch 60 is disposed at a side of the electromagnet 55 and includes an actuator 62 directed toward the springs 37 and 38. The actuator 62 is a plunger that, when depressed, electrically opens the switch 60. The switch assembly is preferably received and held in place within the tray 1 in a switch recess 63 and a corresponding recess in the lid 8.

Figure 6A:
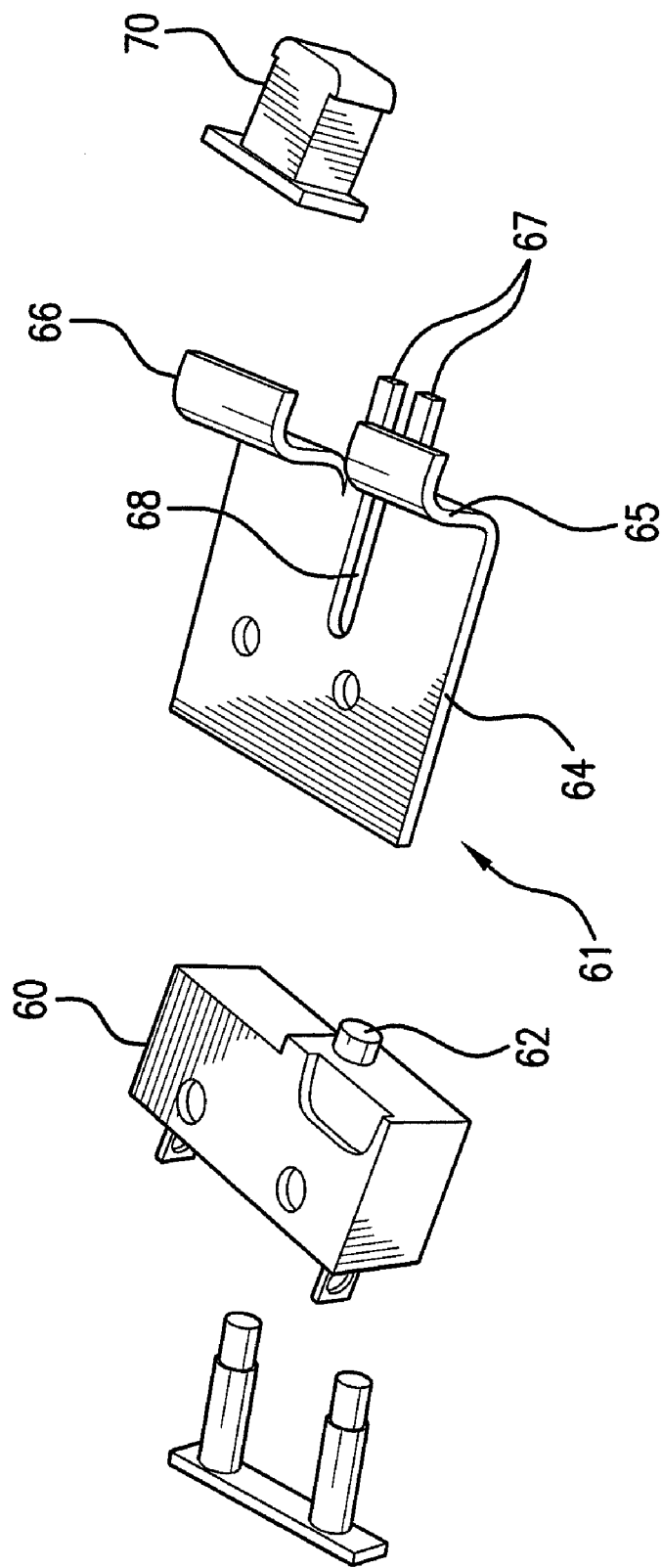
FIGS. 6A and 6B are, respectively, detail views a switch, a mounting support, and a switch actuator, disassembled and assembled, as part of the thermo-magnetic actuator of FIGS. 1A and 3-5.

The switch assembly according to a preferred embodiment includes the switch 60, a mounting support 61, functioning in part to catch the second end 48 of the target 45 mechanically, and a sliding switching member intervening between the second end 48 of the target 45 and the plunger 62 of the switch 60. These parts, and a mounting element for mounting the switch 60 on the support 61, are shown, disassembled and assembled, in FIGS. 6A and 6B, respectively. The switch 60 is supported by the relatively complex support 61, preferably made from a single piece of metal.

The support 61 includes a first side 64 that is generally planar and abuts a side surface of the switch 60. A second side 65 is transverse to the first side and is generally parallel to and spaced from the front surface of the switch 60, where the actuator 62 is located. Further, after a second bend, the support 61 terminates in a third side 66, substantially parallel to the first side. Ends of the third side engage the second end 48 of the magnetic target 45 mechanically, as described below.

The unitary support 61 also includes a central opening 68 where two tines 67, generally coplanar with the first side 64, extend and define between them a guide slot 68. A switching member 70, preferably plastic, is disposed in the central opening 68 and can contact the actuator 62 of the switch 60. The switching member 70 includes a protruding flange 71, visible in FIG. 1B, received between the tines, for guiding the switching member as it is depressed by the second end 48 of the magnetic target 45 and slides to open the switch 60. Upon release of the switching member 70 by the magnetic target, the switch 60 is closed.

Figure 6B:
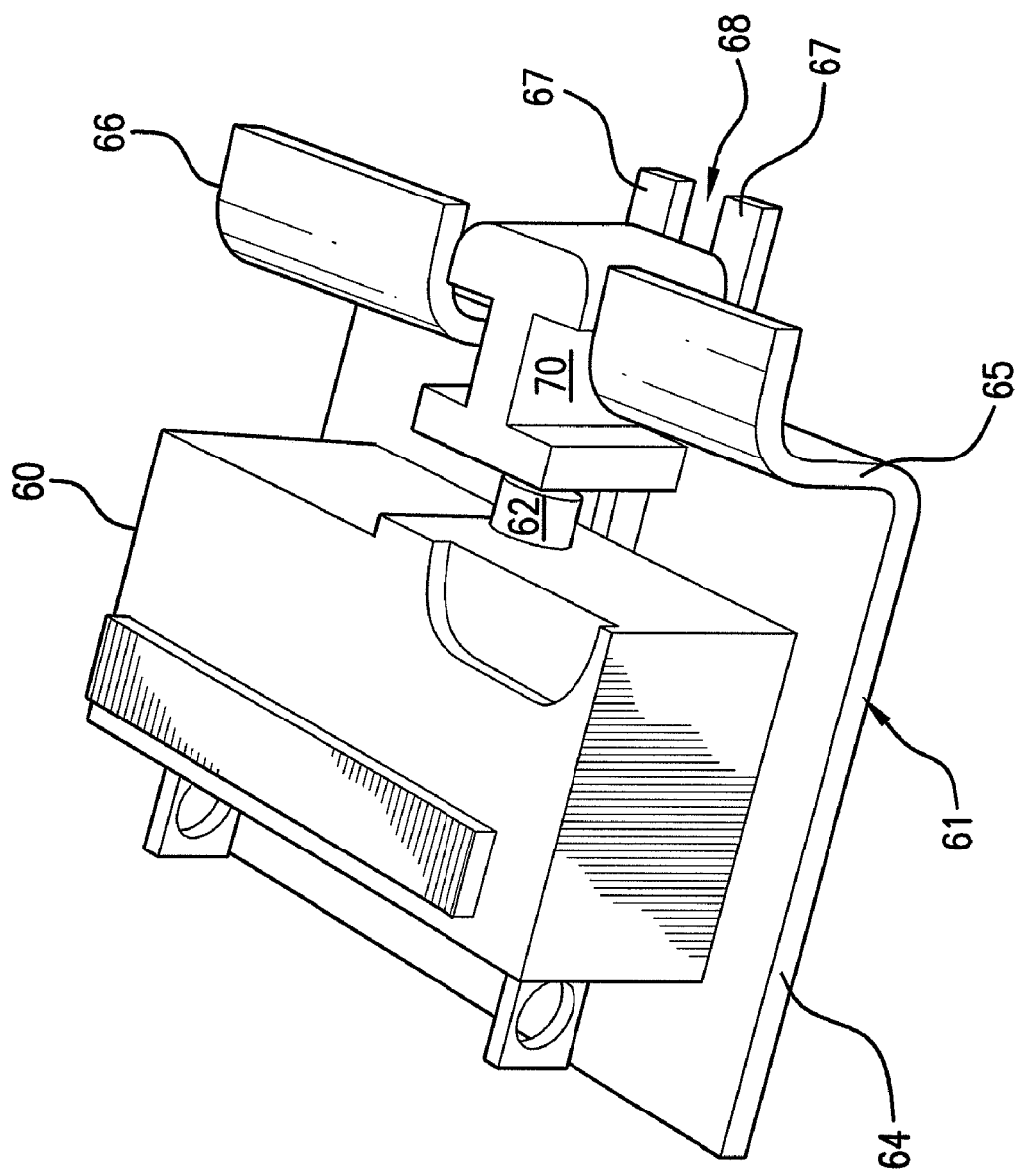

FIG. 6B shows the switch assembly, when assembled, that is, in turn, shown mounted in the tray 1 in FIG. 1A. The side of the switch 60 opposite the support 61 abuts a rib 72 between the recess 63 receiving the switch and the recess 56 receiving the electromagnet 55. The operation of the switch 60 in response to movement of the magnetic target 48 and energization of the electromagnet 56 is described below.

The floor 2 of the tray 1 further includes, as shown in FIG. 1A, an opening 78 for the introduction of electrical conductors from outside the tray to supply electrical current to the electrical components of the thermo-magnetic actuator. This opening 78 is shown at the upper left hand part of the tray as viewed in FIG. 1A. The opening 78 is closed by a fitting in FIG. 1B, which shows two conductors introduced through the fitting. The electrical conductors are insulated from each other, and maintain the sealed state of the container including the tray 1 and the lid 8. The two conductors are connected to the electromagnet 55, which is always powered whenever electrical power is supplied to the thermo-magnetic actuator. The conductors are connected to the heater 12 of the thermal actuator 10 through the switch 60. In the described embodiment, the switch 60 is normally closed, i.e., electrically continuous, when the plunger 62 extends fully outwardly from the switch 60. When the plunger 62 is depressed in the direction of switch 60, then the switch opens and disconnects the conductors from the heater 12, stopping the flow of current to that heater.

The operation of the described embodiment of the thermo-magnetic actuator is most easily understood with respect to the partial sectional views of FIGS. 2-5. FIG. 2 depicts the thermo-magnetic actuator with no electrical power being supplied to either the electromagnet 55 or the heater 12. In that state, the restoring springs 37 and 38 maintain the piston 25 and the tubular rack 26, respectively, in their first positions, closest to the thermal actuator 10. When electrical power is supplied to the thermo-magnetic actuator, the electromagnet 55 generates a magnetic field and the heater 12 produces heat that evaporates the working fluid 13 in the heating chamber 11. The increasing pressure within the heating chamber 11 displaces the diaphragm 16 to the right as shown in FIGS. 2-5. The driving by the diaphragm 16 displaces the piston 25 and the tubular rack 26 against the restoring forces of the springs 37 and 38, respectively. As a result, both the piston 25 and the tubular rack 26 are displaced to the right in the FIGS. 2 and 3. This displacement slides the ferromagnetic target 45 in the same direction. The target 45 is attracted by the magnetic field produced by the electromagnet. When the ferromagnetic target 45 is displaced far enough to the right, in the figures, the second end 48 of the target 45, due to the magnetic attraction of the target to the electromagnet 55, pushes against the switching member 70, which slides in guide slot 68. As a result, the plunger 62 of the switch 60 slides and is pushed into the switch 60. At the same time, that second end 48 becomes mechanically hooked on the third side 66 of the support 61. The electromagnetic attraction of the ferromagnetic target and the tension applied by the springs 37 and 38 maintain that hooked engagement of the end 48 on the third side 66 of the support 61. The displacement of the actuator 62 opens the switch 60 and interrupts the flow of electrical current to the heater 12. FIG. 4 shows the positions of the operative parts of the thermo-magnetic actuator as this state is just achieved. The piston 25 and the tubular rack 26 have reached their respective second positions and the second end 48 of the target has depressed the actuator 62 through the switching member 70.

The sliding movement of the piston 25, driving the rack 26 from the unpowered position shown in FIGS. 2 and 3, to the magnetically latched state, shown in FIG. 4, with power supplied to the heater 12 and the electromagnet 55, results in rotation of the pinion gear 41 and the shaft 42. Thus, the rotational mechanical output of the thermo-magnetic actuator is produced and transmitted to whatever external driven device, such as a valve, may be coupled to the rotatable shaft 42.

Upon the depression of the actuator 62 by the second end 48 of the target 45, current flow to the heater 12 is interrupted so that the working fluid 13 within the heating chamber 11 begins to cool. As a result, the working fluid begins changing phase and, in any event, the pressure within the heating chamber 11 declines. As a result of the reduced pressure within the heating chamber, the piston 25 is pushed to the left in the figures by the restoring force applied by the first spring 37. The tubular rack, on the other hand, remains in the position shown in FIG. 2 because the second end 48 of the target 45 remains hooked or caught on the third side 66 of the support 61.

The positioning of the operative parts of the thermo-magnetic actuator which results from the return of the piston 25 to the original position, and in which the rack is magnetically latched, is illustrated in FIG. 5. In that situation, the only continuing electrical power supplied to the thermo-magnetic actuator is supplied to the electromagnet 55, without any power being supplied to or being consumed by the heater 12.

At the end of the cycle, when all electrical power is withdrawn from the thermo-magnetic actuator, current no longer flows to the electromagnet 55. As a result, there is no magnetic field to attract the ferromagnetic target 45. The target 45 moves away from the electromagnet 55. This disengagement may be ensured by making the second end 48 of the target slightly oblique, perhaps 5° to 10° from perpendicular, to the central portion 46 of the target. In this sliding movement, disengaging the target from the support, causes the second end 48 of the target slips from the third side 66 of the support 61. When the second end 48 has cleared the third side, then the restoring force of the second spring 38 pushes the tubular rack 26 to its original, first position as shown in FIG. 2. Of course, the movement of the tubular rack to the left, in the depicted embodiment, counter rotates the pinion gear 41 that is in mesh with the gear rack 40, counter rotating the shaft 42 and restoring the shaft to its first, original position. Further, since the tubular rack is driven by the second spring 38 without any restraints, the rack returns rapidly to the first position.

The thermo-magnetic actuator, as described, is advantageous because it can maintain the tubular rack in the second position while consuming only enough electrical power to drive the electromagnet 55, without the necessity of supplying the additional electrical power that would be consumed by the heater 12, in order to maintain the magnetically latched state of the thermo-magnetic actuator. Further, in the event of a power failure, the magnetically latched state is released and the actuator returns to the non-powered position as shown at FIG. 2.

Figure 7B:
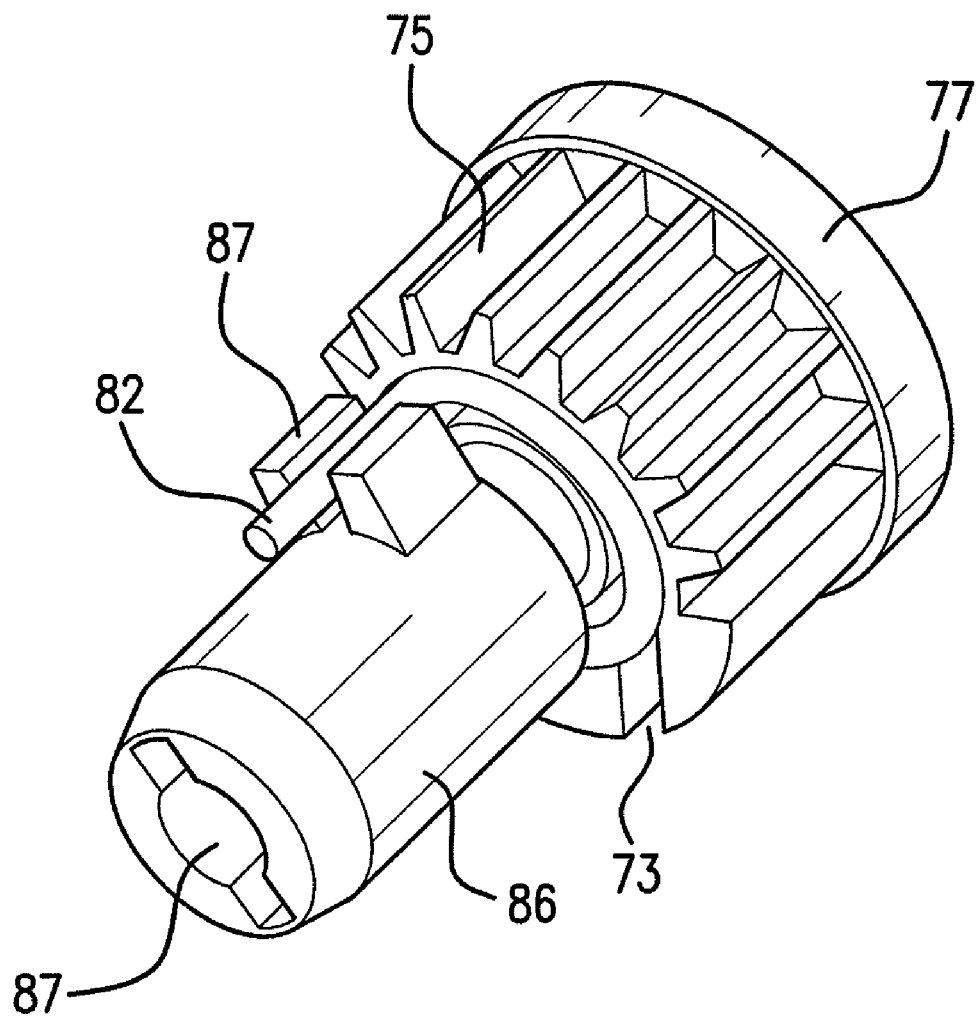

While the rotation of the shaft 42 and the pinion 41 is reliable in response to the movement of the tubular rack 26 between the first and second positions, in some applications of the thermo-magnetic actuator, the shaft 42 might not turn exactly to a desired end position or, through the interaction of the mechanical parts of the thermo-magnetic actuator, may not continuously apply substantially uniform pressure to the device that is driven by the thermo-magnetic actuator. In order to compensate for any failure of the rack 26 or the shaft 42 to reach the full desired position and/or to continue to apply biasing torque to maintain the device connected to the shaft 42 at the fully rotated position, an additional biasing structure may be provided. An example of such a biasing structure is illustrated in FIGS. 7A and 7B. FIG. 7A shows a pinion gear 61, a coil spring 72, and the shaft 42 before assembly and FIG. 7B shows those parts assembled.

As shown in other figures, the pinion gear includes radial teeth arranged around and projecting from a peripheral wall 75 of at least part of the pinion gear. These pinion gear teeth engage corresponding teeth of the tubular rack 26. The periphery of the pinion gear 61 includes a slot 73 passing through the circumferential wall 75 that otherwise includes the radial gear teeth. Further, the pinion 61 includes a central tubular portion 74 that receives part of the shaft 42, as described below. The tube 74 is spaced from the wall 75 that includes the radial gear teeth by an annular volume 76. A base 77 supports that circumferential wall 75 and the tube 74 and defines the bottom of the annular volume 76.

The coil spring 72 includes a helical coil 81. At a first end of the coil 81 a first spring finger 80 extends tangentially to the coil. A second spring finger 82 extends parallel to the diameter of the coil 81 at a second end of the coil. As described below, the first finger 80 is placed within the slot 73 of the pinion gear, with the coil 81 in the annular volume 76, surrounding the tube 74 so that the second finger 82 projects outwardly, parallel to the rotational axis of the pinion gear.

The shaft 42 includes two coaxial regions of different diameters. The first, smaller diameter region 85 is dimensioned to be received within the tube 74 of the pinion gear 61. The second, larger diameter region 86 includes two important features. At the distal end of that region 86, an opening 87 is provided for receiving a shaft of the device driven by the thermo magnetic actuator. The opening 87 may be partially circular in cross-section and include a planar portion, i.e., a flat, to engage a complementary element. That flat ensures rotation of the device that engages the shaft 42, upon rotation of the shaft 42. On the external surface of the second region 86, two ears 87 extend radially, separated from each other by a distance chosen to receive and engage the wire of the spring 72.

When the three elements of FIG. 7A are assembled, as shown in FIG. 7B, the second finger 82 of the spring is inserted between the two ears 87 of the shaft 42. By properly designing the relative positions of the fingers 80 and 82 of the spring 72, in conjunction with the location of the slot 73 of the pinion gear and the positioning of the ears 87 on the shaft 42, a torsional bias can be applied to a device engaged with the shaft 42 in the opening 87.

By way of further explanation, upon the extension of the tubular rack 26 to the second position, the driven device is preferably turned, through the rotation of the shaft 42, slightly beyond the desired end point of rotation of the driven device. The attempted rotation of the driven device beyond the expected end of its travel, i.e., a degree of over travel, is intended to ensure that the driven device always reaches the end point of travel. Further, the "over travel" is designed to ensure that the driven device will remain at its end point so long as the shaft 42 has been turned to its second position. When the driven device is a valve for controlling flow of a fluid, for example, the continuously applied pressure ensures that the valve remains fully open or fully closed. Of course, the device that is driven reacts to the attempted over travel and applies a counterforce to the actuator. That force urges the pinion gear to counter rotate and the tubular rack to slide toward the thermal actuator 10. The biasing structure compensates for these counter-rotational and sliding forces so there is no damage to or unlatching of the thermo-magnetic actuator. The coil spring 72 responds resiliently, and yields, to the degree necessary, to absorb the counter-rotational force applied to the pinion gear 61 by the driven device. At the same time, this resilient force of the spring 72 ensures that the device driven by the thermo-magnetic actuator remains rotated to its full end point and latching of the target is achieved and maintained. A very specific example of such an application of the thermo-magnetic actuator is the rotation of the butterfly of a butterfly valve. By providing the resilient biasing assembly of the pinion and shaft of FIGS. 7A and 7B, the butterfly is maintained against its stops, either fully opened or fully closed, depending on the specific valve and actuator construction, and the over travel of the pinion gear is absorbed by the coil spring 72, acting in torsion.

The assembly of FIG. 7B provides an example of how the container may be sealed with respect to the shaft 42. In one embodiment, the shaft of the driven device, which is received in the opening 87, may include an O-ring or another seal that bears on the side wall 5 of the tray 1. In that arrangement, an external sealing of the container is achieved. In an alternative embodiment, the shaft 42 may include one or more O-rings on the larger diameter region 86, for example, contacting the adjacent side wall 5 of the tray 1. Those O-rings provide an internal seal, sealing the container that includes the tray 1. In either sealing arrangement, the external device driven by the thermo-magnetic actuator can then be engaged or disengaged from outside the thermo-magnetic actuator without disturbing the container. The engagement and disengagement are achieved by inserting into and withdrawing from the opening 87 of the shaft 42 a keyed shaft of the device being driven.

Figure 8:
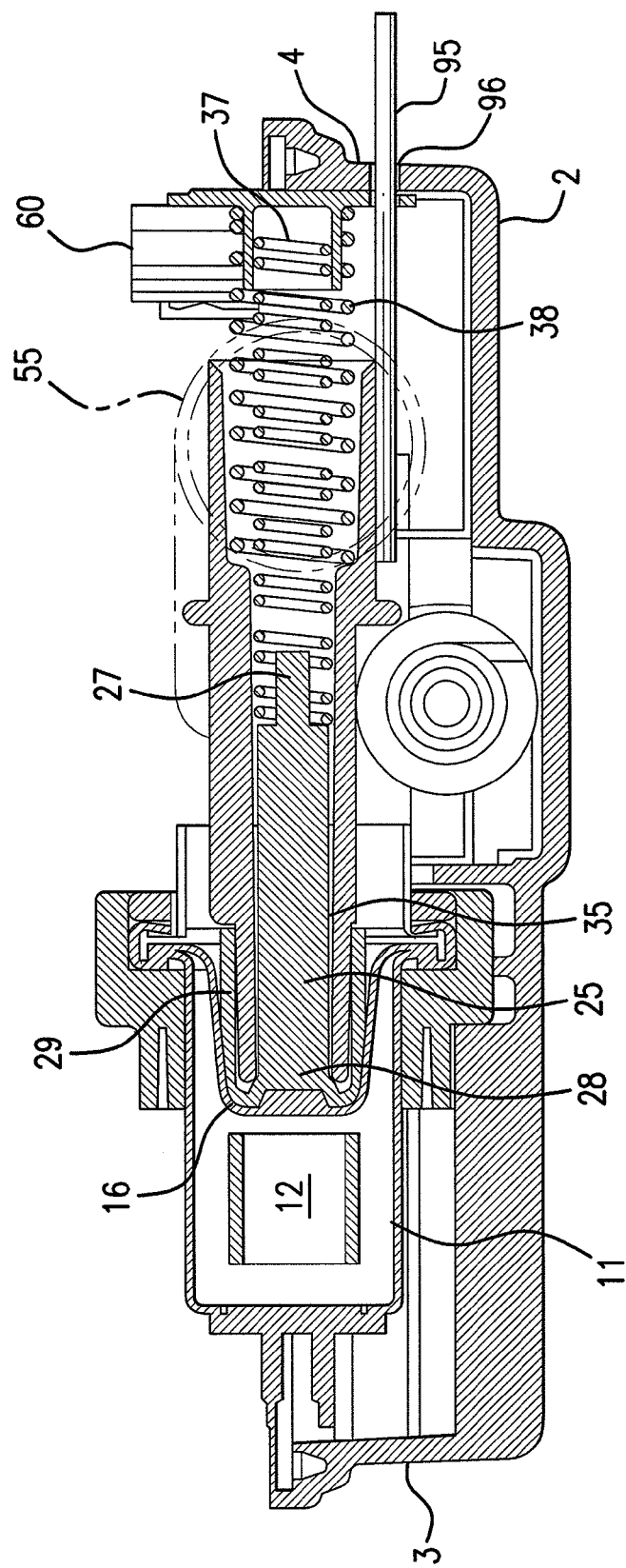
FIG. 8 is a sectional side view of a thermo-magnetic actuator according to an alternate embodiment of the invention.

The described embodiment of the thermo-magnetic actuator provides, as a mechanical output, rotation of a shaft. Most of the applications made of the actuator require rotary output motion. However, the thermo-magnetic actuator can also provide linear motion as its output, as a result of the movement of the piston and tubular rack from their respective first positions to their respective second positions and vice versa. An example of such an alternative embodiment is illustrated in a cross-sectional view in FIG. 8. In place of the rack gear 40 and pinion gear 41, a simple rod 95 is joined to the tubular rack 26 and protrudes through an opening 86 in the side wall 4 of the tray. In the former embodiment, the shaft 42 is sealed to be water tight, for example with O-rings, permitting rotation of the shaft 42 while excluding the entry of foreign matter into the container of the thermo-magnetic actuator. In the alternative embodiment, the opening 96 preferably includes a similar seal with respect to the rod 95 that permits the rod to move in and out relative to the container, while preventing foreign matter from entering the sealed container that includes the tray 1 and the lid 8.

The foregoing discussion focuses on particular embodiments of the invention. Numerous variations and changes within the scope of the invention will occur to those of ordinary skill in the relevant arts. Accordingly, the scope of the invention is defined by the following claims.

We claim:

1. A thermo-magnetic actuator comprising:
a tray having opposed first and second side walls, and third side walls joining the first and second side walls;
an actuator comprising:
a closed heating chamber disposed in the tray, proximate the first side wall of the tray, the closed heating chamber including
a diaphragm as one wall of the closed heating chamber, wherein the diaphragm is remote from the first side wall of the tray,
a working fluid changing phase upon heating and located within the closed heating chamber, and
an electrical heater disposed within the closed heating chamber for heating the working fluid upon application of electrical power to the electrical heater;

a piston having opposed first and second ends, disposed in and slidable relative to the tray, wherein the first end of the piston contacts the diaphragm so that the piston is driven and slides relative to the tray from a first position to a second position upon movement of the diaphragm in response to heating of the working fluid;

a tubular rack having opposed first and second ends and slidably disposed in the tray, wherein the first end of the tubular rack is engageable by the piston, at the first end of the piston, for sliding of the tubular rack from a first position to a second position when the piston is driven by the diaphragm from the first position to the second position;

a first spring bearing on the second end of the piston and the second side wall of the tray and urging the piston against the diaphragm;

a second spring bearing on the second end of the tubular rack and the second side wall of the tray and urging the tubular rack toward the closed heating chamber; and a ferromagnetic target having opposed first and second ends and a central portion between, generally transverse to, and joining the first end of the ferromagnetic target to the second end of the ferromagnetic target, wherein the first end of the ferromagnetic target is disposed in a recess in the tubular rack proximate the closed heating chamber, and the central portion of the ferromagnetic target extends from the first end of the ferromagnetic target along and outside the tubular rack, away from the closed heating chamber to the second end of the ferromagnetic target;

an electromagnet located in the tray proximate both the second end of the tubular rack and the central portion of the ferromagnetic target, wherein the electromagnet attracts the ferromagnetic target when an electrical current flows through the electromagnet;

an electrical switch having electrically open and electrically closed states and disposed in the tray proximate the second end of the tubular rack, wherein the electrical switch is actuated to electrically open the current path to the electrical heater by the second end of the ferromagnetic target when the rack slides to the second position, and the electromagnet attracts the ferromagnetic target and the second end of the ferromagnetic target actuates the switch;

a gear rack on an external surface of the tubular rack;

a rotatable shaft that is accessible from outside the tray; and a pinion gear mounted on the rotatable shaft, wherein the pinion gear is in mesh with the gear rack so that sliding of the tubular rack between the first and second positions rotates the shaft and the pinion gear.

2. The thermo-magnetic actuator according to claim 1 wherein the tray includes a floor adjoining the first, second, and third side walls, and the floor of the tray includes a heating chamber recess complementary in shape to at least part of the closed heating chamber, receiving and retaining the closed heating chamber in position in the tray;

a rack recess complementary in shape to the tubular rack, receiving and retaining the tubular rack while permitting the tubular rack to slide relative to the tray;

an electromagnet recess complementary in shape to the electromagnet, receiving and retaining the electromagnet in position in the tray; and a switch recess complementary in shape to the switch, receiving and retaining the switch in position in the tray.

3. The thermo-magnetic actuator according to claim 1, wherein the switch includes an actuating plunger actuated by the second end of the ferromagnetic target and comprising a switch support disposed in the tray and at least partially between the plunger and the electromagnet for mechanically latching the second end of the ferromagnetic target in a position actuating the plunger while the electromagnet attracts the ferromagnetic target.

4. The thermo-magnetic actuator according to claim 3, including a sliding switching member slidingly mounted on the switch support and contacting the plunger, the second end of the ferromagnetic target contacting and sliding the switching member to actuate the switch.

5. The thermo-magnetic actuator according to claim 1, wherein the first and second springs are coaxial and one of the first and second springs is larger in diameter than the other of the first and second springs.

6. The thereto-magnetic actuator according to claim 5, wherein the tubular rack includes an internal shoulder engaged by the second spring.

7. The thermo-magnetic actuator according to claim 5, wherein the second end of the piston includes a projecting piston pin disposed within the first spring for retaining the first spring on the piston.

8. The thermo-magnetic actuator according to claim 1, wherein the first end of the piston includes a shell and a body surrounded by and spaced from the shell, and the body and shell define an annular volume in which the first end of the rack is received.

9. The thermo-magnetic actuator according to claim 1, including a lid sealed to the tray.

10. The thermo-magnetic actuator according to claim 9, wherein the lid includes recesses for retaining at least part of the heating chamber, the tubular rack, the electromagnet, and the switch in position in the lid.

11. The thermo-magnetic actuator according to claim 1, wherein the closed heating chamber includes a cup having an open end and a cap covering the open end and peripherally clamping the diaphragm.

12. The thermo-magnetic actuator according to claim 1 including a third spring resiliently coupling the pinion gear to the shaft and absorbing counter rotational torque applied to the pinion gear through the shaft.

13. A thermo-magnetic actuator comprising:

a tray having opposed first and second side walls and third side walls joining the first and second side walls;

an actuator comprising:

a closed heating chamber disposed in the tray, proximate the first side wall of the tray, the closed heating chamber including a diaphragm as one wall of the closed heating chamber, wherein the diaphragm is remote from the first side wall of the tray, a working fluid changing phase upon heating and located within the closed heating chamber, and an electrical heater disposed within the closed heating chamber for heating the working fluid upon application of electrical power to the electrical heater;

a piston having opposed first and second ends, disposed in and slidable relative to the tray, wherein the first end of the piston contacts the diaphragm so that the piston is driven and slides relative to the tray from a first position to a second position upon movement of the diaphragm in response to heating of the working fluid;

a tubular rack having opposed first and second ends and slidably disposed in the tray, wherein the first end of the tubular rack is engageable by the piston, at the first end of the piston, for sliding of the tubular rack from a first position to a second position when the piston is driven by the diaphragm from the first position to the second position;
a first spring bearing on the second end of the piston and the second side wall of the tray and urging the piston against the diaphragm;
a second spring bearing on the second end of the tubular rack and the second side wall of the tray and urging the tubular rack toward the closed heating chamber; and
a ferromagnetic target having opposed first and second ends and a central portion between, generally transverse to, and joining the first end of the ferromagnetic target to the second end of the ferromagnetic target, wherein
the first end of the ferromagnetic target is disposed in a recess in the tubular rack proximate the closed heating chamber, and
the central portion of the ferromagnetic target extends from the first end of the ferromagnetic target along and outside the tubular rack, away from the closed heating chamber to the second end of the ferromagnetic target;
an electromagnet located in the tray proximate both the second end of the tubular rack and the central portion of the ferromagnetic target, wherein the electromagnet attracts the ferromagnetic target when an electrical current flows through the electromagnet;
an electrical switch having electrically open and electrically closed states and disposed in the tray proximate the second end of the tubular rack, wherein the electrical switch is actuated to electrically open the current path to the electrical heater by the second end of the ferromagnetic target when
the rack slides to the second position, and
the electromagnet attracts the ferromagnetic target and the second end of the ferromagnetic target actuates the switch; and
a rod on an exterior surface of the tubular rack and extending outside the tray so that sliding of the tubular rack between the first and second positions extends and retracts the rod with respect to the tray.

14. A thermo-magnetic actuator comprising:
a tray having opposed first and second side walls, and third side walls joining the first and second side walls;
an actuator comprising:
a closed heating chamber disposed in the tray, proximate the first side wall of the tray, the closed heating chamber including
a diaphragm as one wall of the closed heating chamber, wherein the diaphragm is remote from the first side wall of the tray,
a working fluid changing phase upon heating and located within the closed heating chamber, and
an electrical heater disposed within the closed heating chamber for heating the working fluid upon application of electrical power to the electrical heater;
a piston having opposed first and second ends, disposed in and slidable relative to the tray, wherein the first end of the piston contacts the diaphragm so that the piston is driven and slides relative to the tray from a first position to a second position upon movement of the diaphragm in response to heating of the working fluid;
a tubular rack having opposed first and second ends and slidably disposed in the tray, wherein the first end of the tubular rack is engageable by the piston, at the first end of the piston, for sliding of the tubular rack from a first position to a second position when the piston is driven by the diaphragm from the first position to the second position;
a first spring bearing on the second end of the piston and the second side wall of the tray and urging the piston against the diaphragm;
a second spring bearing on the second end of the tubular rack and the second side wall of the tray and urging the tubular rack toward the closed heating chamber;
a gear rack on an external surface of the rack;
a rotatable shaft that is accessible from outside the tray and includes a pair of outwardly projecting ears radially spaced apart from each other;
a pinion gear mounted on the rotatable shaft, wherein
the pinion gear is in mesh with the gear rack so that sliding of the tubular rack between the first and second positions rotates the shaft and the pinion gear and
the pinion gear includes an annular recess; and
a third spring including a coil portion disposed in the annular recess of the pinion gear and a finger projecting outwardly from and transverse to the coil portion and disposed between the pair of ears on the shaft, resiliently coupling the pinion gear to the shaft and absorbing counter rotational torque applied to the pinion gear through the shaft.

15. The thermo-magnetic actuator according to claim 13, wherein the tray includes a floor adjoining the first, second, and third side walls, and the floor of the tray includes
a heating chamber recess complementary in shape to at least part of the closed heating chamber, receiving and retaining the closed heating chamber in position in the tray;
a rack recess complementary in shape to the tubular rack, receiving and retaining the tubular rack while permitting the tubular rack to slide relative to the tray;
an electromagnet recess complementary in shape to the electromagnet, receiving and retaining the electromagnet in position in the tray; and
a switch recess complementary in shape to the switch, receiving and retaining the switch in position in the tray.

16. The thermo-magnetic actuator according to claim 13, including a lid sealed to the tray.

17. The thermo-magnetic actuator according to claim 16, wherein the lid includes recesses for retaining at least part of the heating chamber, the tubular rack, the electromagnet, and the switch in position in the lid.

18. The thermo-magnetic actuator according to claim 13, wherein the first and second springs are coaxial and one of the first and second springs is larger in diameter than the other of the first and second springs.

19. The thermo-magnetic actuator according to claim 18, wherein the tubular rack includes an internal shoulder engaged by the second spring.

20. The thermo-magnetic actuator according to claim 18, wherein the second end of the piston includes a projecting piston pin disposed within the first spring for retaining the first spring on the piston.

* * * * *